United States Patent [19]

Mallow

[11] Patent Number: 4,710,226

[45] Date of Patent: Dec. 1, 1987

[54] FLUIDIZATION OF LIMESTONE SLURRIES AND RESULTANT PRODUCTS

[75] Inventor: William A. Mallow, Helotes, Tex.

[73] Assignee: Southwest Research Institute, San Antonio, Tex.

[21] Appl. No.: 849,384

[22] Filed: Apr. 8, 1986

[51] Int. Cl.$^4$ ............................................. C04B 2/06
[52] U.S. Cl. ................................. 106/119; 106/100; 106/118; 423/637; 252/313.1; 252/357
[58] Field of Search ....................... 106/100, 118, 119; 423/637; 252/313.1, 357

[56] References Cited

U.S. PATENT DOCUMENTS

| | | | |
|---|---|---|---|
| 1,184,320 | 5/1916 | Carson | 106/118 |
| 2,709,661 | 5/1955 | Dietz | 106/118 |
| 3,754,864 | 8/1973 | Gindler | 436/74 |
| 4,026,991 | 5/1977 | Chamberlain | 423/268 |
| 4,070,325 | 1/1978 | Burke, Jr. | 106/277 |
| 4,330,339 | 5/1982 | Nimerick | 106/243 |

FOREIGN PATENT DOCUMENTS 577184 10/1977 U.S.S.R. .............................. 106/100

Primary Examiner—Mark L. Bell
Assistant Examiner—Steven Capella
Attorney, Agent, or Firm—Sigalos & Levine

[57] ABSTRACT

The method of treating a limestone slurry to remove water therefrom comprising admixing therewith at least about 0.25 part by weight of a fluidizing agent for each 100 parts by weight of solids in said slurry, said fluidizing agent consisting essentially of a micelle-forming surfactant and a protective colloid in a ratio of from about 2:1 to 1:2; the resultant limestone mud containing at least about 70% solids; and a fluidizing agent for dewatering a limestone slurry consisting essentially of a micelle-forming surfactant and a protective colloid in a ratio of from about 2:1 to 1:2.

10 Claims, 1 Drawing Figure

WET PROCESS LIMESTONE CALCINATION

WET PROCESS LIMESTONE CALCINATION

4,710,226

FLUIDIZATION OF LIMESTONE SLURRIES AND RESULTANT PRODUCTS

BACKGROUND OF THE INVENTION

In any industrial process involving the calcination of lime such as the wet process production of cement, the production of lime itself, and the sugar industry where they calcine lime to use the resultant product as part of the sugar-making process, slurries or muds of limestone or lime are formed which contain large amounts of lime and are recycled into the calcining kilns. Such slurries introduce various amounts of water and such water must first be removed in order to obtain proper calcination. The amount of energy required for such drying; in terms of either hydrocarbon fuel or other type of fuel, represents a substantial cost as does the time involved for drying and many efforts have been undertaken to try and reduce the amount of water in such slurries.

One of the difficulties encountered is that when the filtered solids contents of such slurries reach the level in the range of around 65% solids they cannot be further drained by filtration and become nonpumpable cakes. Efforts to try to fluidize such limestone slurries, often referred to as lime muds, or to enhance water removal by normal methods have not been successful either because they add undesirable components to the final desired product such as the cement or adversely affect the apparatus such as the kilns which are run at exceedingly high temperatures in the level of 1000° C. and higher, or they are too costly at the effective concentration.

Heretofore, therefore it has not been possible to effectively or economically reduce the water content of the lime muds beyond 25–30% nor to maintain them in a pumpable state when such is desirable.

SUMMARY OF THE INVENTION

The present invention overcomes the problems of the prior art and results in high solids content of often pumpable limestone slurries or cakes which have such a reduced water content that less energy is used in the subsequent calcination thereof.

Briefly stated, the present invention comprises a limestone slurry; preferably pumpable, containing at least about 70% solids and at least about 0.25 part by weight for each 100 parts by weight of said solids of a fluidizing agent consisting essentially of a micelle-forming surfactant an a protective colloid in a ratio thereof of from about 2:1 to 1:2.

Further, the invention comprises a fluidizing agent consisting essentially of a micelle-forming surfactant and a protective colloid in a ratio thereof of from about 2:1 to 1:2.

The invention also comprises the method of treating a limestone slurry to remove water therefrom comprising admixing therewith at least about 0.25 part by weight of a fluidizing agent for each 100 parts by weight of solids in said slurry; said fluidizing agent consisting essentially of a micelle-forming surfactant and a protective colloid in a ratio of from about 2:1 to 1:2.

DETAILED DESCRIPTION

Figure 1:
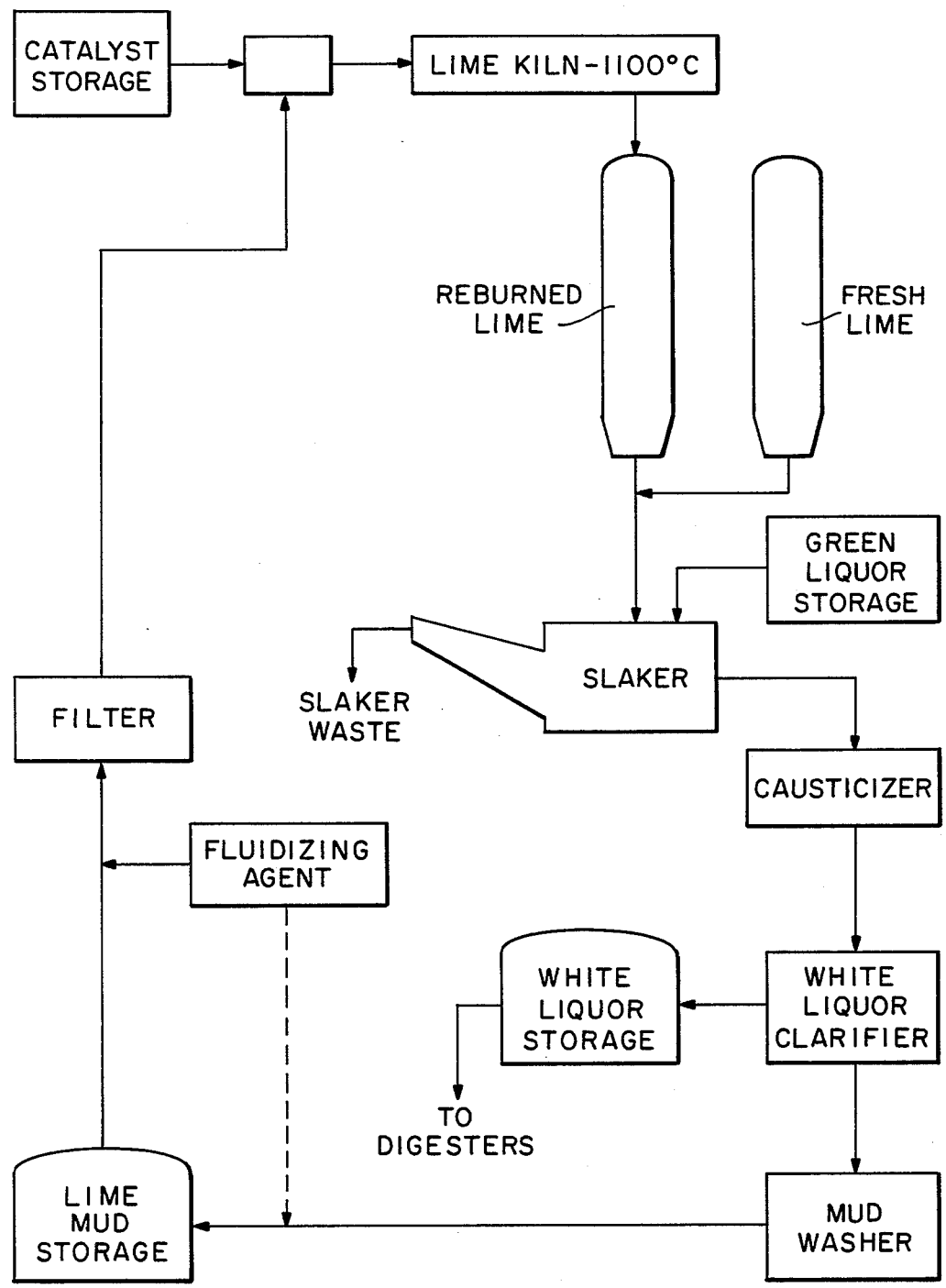
FIG. 1 is a diagrammatic representation of a conventional wet process limestone calcination.

While the present invention is particularly directed to any industrial process for the dewatering and/or fluidization of high solid slurries; such as limestone slurries, it has application and is useful in controlling the rheology, viscosity, and solids content of other wastes or solids such as drilling muds and oil well cements. It will be discussed in conjunction with the treatment of lime slurries (hereinafter referred to as "lime muds"). Such lime muds after processing and filtration to unpumpable cakes contain usually about 60 to 65% solids and in the main contain calcium carbonate ($CaCO_3$), although they also contain sodium carbonate ($Na_2CO_3$), sodium hydroxide (NaOH), and sodium sulphate ($Na_2SO_4$). The calcium carbonate by far forms the major constituent of the mud. As indicated, at the present time such filtered muds contain only 60 to 65% solids and efforts to go above that level have been very difficult with the net result that the 35 to 40% of water therein must be removed in the lime kiln.

Reference to FIG. 1 of the drawing shows a standard wet process limestone calcination process in which the lime mud is filtered, admixed with the catalyst, and fed into the lime kiln.

In accordance with the present invention a fluidizing agent is added to the lime slurry which enables the solids content to increase to well over 70% by weight, thus effecting a substantial drop in the amount of water that must be removed during calcination. The savings in energy costs and processing time by having to remove less water are evident.

The two essential constituents of the fluidizing agent are a micelle-forming surfactant and a protective colloid. While the precise theory is not understood, it is believed that such micelle-forming surfactants tend to coat the lime solids in the mud making them more resistant to caking and solidifying in low water concentrations. The protective colloid, it is believed, forms a charge about the particles which again is one which acts to prevent the solids from clumping together and facilitates a more efficient removal of water during filtration.

As to the micelle-forming surfactant, it is preferred to use an alkanolamide such as Clindrol 206CGN and Clindrol 207CGN. Other surfactants which are also capable of coating lime can also be utilized, examples being the nonionic ethylene oxide derivatives of ethanolamine and $C_{12}$ to $C_{15}$ fatty acids.

With respect to the protective colloid, it is preferred to use a naturally occurring or synthetic tall oil fatty acid or compositions thereof sold commercially as ACTINOL's most suitably ACTINOL FA-1 and D29LR. Such compositions primarily contain linolenic and oleic acids with some rosin acids present. Mixtures of fatty acids such as lauric, stearic, oleic, and the like can be used so long as they have the desired blend of properties.

As to proportions, it is preferred to utilize a ratio of micelle-forming surfactants to protective colloid of from about 2:1 to 1:2 by weight with 1 to 1 being optimum. In terms of the amount of fluidizing agent that is utilized with the mud, the amount used is the least amount required to fluidize the mud or improve its filtration efficiency; usually about 0.25 parts by weight for each 100 parts by weight of solids in the mud. Fluidizing is used to denote bringing the mud to a thixotropic or pumpable state even at a high solids content of 70% or higher which is possible with some lime muds. The lowest amount is used for economic reasons and to ensure that there is no large amounts of fluidizing agent in the mud to adversely affect the subsequent usage of the mud when it is, for example, again mixed with catalyst and recycled into the lime kiln.

The point of addition of the fluidizing agent to the mud is best shown in the illustration of a wet process limestone calcination of FIG. 1. The fluidizing agent is preferably added prior to the mud filter and after the lime mud storage. If adequate mixing is available the fluidizing agent can be added to the mud after it leaves the mud washer and is to be placed in the lime mud storage. The amount of fluidizing added per 100 parts by weight of mud based on solids in the mud is preferably from about 0.25 to 1 part by weight based on 100 parts of solids in the mud. In addition to filtration, any other conventional technique presently used to remove water from lime slurries can also be utilized with the fluidizing agent preferably just prior to the water removal step.

The invention will be further described in connection with the following examples which are set forth for purposes of illustration only.

EXAMPLE 1

A lime mud after filtration and containing 63.2% solids and correspondingly 36.8% water was admixed with 0.25% of a fluidizing agent consisting of equal parts by weight of ACTINOL D29LR (a tall oil mixture of rosin acids and the fatty acid linolenic and oleic) and CLINDROL 206CGN/an alkanolamide of a fatty acid). The admixture was then subjected to suction filtration and the resultant and contained 73.5% solids and was thixotropic. It could be pumped like a viscous liquid.

EXAMPLE 2

A lime mud after filtration containing 27.5% water and correspondingly 72.5% of lime solids was admixed with 1% by weight of the fluidizing agent set forth in Example 1 and likewise subjected to suction filtration. The solids content was boosted to 75% solids and was thixotropic.

EXAMPLE 3

A lime slurry from lime mud washer containing 23.1% solids was admixed with 0.25% of the fluidizing agent of Example 1 based on the total solids in the slurry and the resultant slurry subjected to suction filtration. The resultant material was a thixotropic cake containing 74.1% solids.

EXAMPLE 4

A liquid lime slurry from a mud washer containing 31.5% solids was treated again with an equivalent amount of the fluidizing agent of Example 3; namely, 0.25% by weight thereof based on the total solids in the liquid slurry. It was subjected to suction filtration and the resultant thixotropic cake contained 73.3% total solids.

There will be seen that in each instance the amount of solids level was dramatically increased much above the usual percentage of about 65% solids that has been obtainable heretofore for lime muds. More particularly and importantly also the solids were in a form of a thixotropic cake which in many cases may be easily pumped throughout the system making it much easier to handle. Moreover, the amount of fluidizing agent used to effect such a result is so minimal that the cost involved is small and moreover one is not adding to the lime kiln and subsequent procedure a material which will build up or adversely affect any resultant product. This also avoids the addition of any acidic or alkali material to place the cake in a fluidizable state thus eliminating any damage to the lime kiln.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. The method of treating a limestone slurry to remove water therefrom comprising admixing therewith at least about 0.25 part by weight of a fluidizing agent for each 100 parts by weight of solids in said slurry, said fluidizing agent consisting essentially of a micelle-forming surfactant and a protective colloid in a ratio of from about 2:1 to 1:2 by weight, and then removing water from the slurry.

2. The method of claim 1 wherein water is removed to give a solids content of at least about 70%.

3. The method of claim 1 wherein the ratio is about 1:1.

4. The method of claim 1, 2, or 3 wherein said micelle-forming surfactant is an alkanolamide of a fatty acid and said protective colloid is a mixture of linolenic and oleic acids and rosin acids.

5. A limestone mud containing at least about 70% solids and at least about 0.25 part by weight for each 100 parts by weight of said solids of a fluidizing agent consisting essentially of a micelle-forming surfactant and a protective colloid in a ratio of from about 2:1 to 1:2 by weight.

6. The limestone mud of claim 5 wherein the ratio is about 1:1.

7. The limestone mud of claim 5 or 6 wherein said micelle-forming surfactant is an alkanolamide of a fatty acid and said protective colloid is a mixture of linolenic and oleic acids and rosin acids.

8. A fluidizing agent for dewatering a limestone slurry consisting essentially of a micelle-forming surfactant capable of coating lime and a protective colloid selected from a mixture of linolenic and oleic acids and rosen acids and mixtures of fatty acids in a ratio of from about 2:1 to 1:2.

9. The fluidizing agent of claim 8 wherein the ratio is about 1:1.

10. A fluidizing agent for dewatering a limestone slurry consisting essentially of an alkanolamide of a fatty acid and a mixture of linolenic and oleic acids and rosin acids in a ratio of from about 2:1 to 1:2.

* * * * *